_United States Patent_ [19]

Miller

[11] Patent Number: 5,212,745
[45] Date of Patent: May 18, 1993

[54] FIXED AND TEMPERATURE TUNED FIBER FABRY-PEROT FILTERS

[75] Inventor: Calvin M. Miller, Atlanta, Ga.
[73] Assignee: Micron Optics, Inc., Atlanta, Ga.
[21] Appl. No.: 801,450
[22] Filed: Dec. 2, 1991
[51] Int. Cl.$^5$ .............................................. G02B 6/26
[52] U.S. Cl. ....................... 385/25; 385/49; 385/52; 385/73; 385/75; 385/64
[58] Field of Search ........................ 385/25, 27, 31, 49, 385/52, 73, 75, 97, 98, 99, 64, 82

[56] References Cited

U.S. PATENT DOCUMENTS

| 4,545,644 | 10/1985 | DeVeau et al. | 350/96.21 |
| 4,813,756 | 3/1989 | Frenkel et al. | 385/73 |
| 4,830,451 | 5/1989 | Stone | 385/50 |
| 4,861,136 | 8/1989 | Stone et al. | 385/27 |
| 4,923,273 | 5/1990 | Taylor | 385/48 |
| 5,062,684 | 11/1991 | Clayton et al. | 385/27 |
| 5,073,004 | 12/1991 | Clayton et al. | 385/27 |

FOREIGN PATENT DOCUMENTS 0437963 7/1991 European Pat. Off. .
0457484 11/1991 European Pat. Off. .

OTHER PUBLICATIONS

Stone et al., _Elect. Lett._, 23(15), 16 Jul. 1987, "Pigtailed high-finesse tunable fiber Fabry–Perot Interferometers with Large, Medium and Small Free Spectral Ranges", pp. 781–783.

_Primary Examiner_—Frank Gonzalez
_Attorney, Agent, or Firm_—Greenlee & Winner

[57] ABSTRACT

A fiber optic Fabry-Perot etalon filter constructed with a resonance cavity which is variable in length to enable variations in temperature to tune the filter to a desired frequency while maintaining accurate alignment of the fiber across the filter. Each fiber end is encased in a ferrule with the two ends placed in a facing relationship. The fibers are aligned and held by an appropriate fixture designed to allow a portion of the ferrule assembly containing the resonance cavity to expand or contract with temperature variation. The two mirrors defining the nominal size of the resonance cavity may be deposited on the facing end of each of the two ferrules, on an end of a separate waveguide located between the ends of the ferrules, or on any combination of these elements. Ferrules may be wafered, that is, a wafer of material may be bonded to the mirrored end of one or both ferrules. A portion of the ferrule/assembly including the facing ends of the two ferrule assemblies may be of smaller diameter than the remainder of the ferrules. By altering the length of the reduced diameter portion, filters are fabricated with greater or lesser freedom of movement in adjusting cavity size, thereby enabling tunable filters of differing spectral ranges. A fixed fiber optic Fabry-Perot filter is also disclosed utilizing ferrules, at least one of which is wafered and using one or more rotary mechanical splice fixtures to hold the ferrules in rigid alignment.

62 Claims, 6 Drawing Sheets

FIXED AND TEMPERATURE TUNED FIBER FABRY-PEROT FILTERS

TECHNICAL FIELD

This invention relates to fixed and tunable Fabry-Perot optical fiber filters. Tuning is accomplished by changing the temperature or index of refraction of the filter.

BACKGROUND OF THE INVENTION

Transmission of information by the use of light over optical fibers has found widespread use in long-haul telecommunication systems. In these one-to-one, second generation systems, optical signals are generated, transported along optical fibers and detected to regenerate the original electronic signal with as little change as possible. Fibers are substituted for coaxial or radio transmission media, all signal processing is done electronically and aside from lower cost and higher quality digital transmission, little else is obtained from the optical fiber media. Third generation optical systems will use optical fiber amplifiers, optical fiber multiplex-/demultiplexers, and optical fiber splitters, couplers, filters, equalizers, switches and other optical signal processors and will exploit much more of the enormous bandwidth capacity of single-mode optical fibers.

Future use of optical fibers for wideband local distribution, metropolitan and local area networks as well as multiple access computer networks will require third generation optical fiber systems especially if digital high definition video or high bit rate data signals are involved. Designs for these future systems will go beyond simple, single-channel, point-to-point optical fiber links and will include one-to-many distribution and one-to-any multiple-access networks. These applications (1) will require significant optical signal processing without conversion to electronic signals, (2) will require use of many different wavelengths, and (3) will use a significant portion of the single-mode optical fiber bandwidth capacity of approximately 25,000 GHz which corresponds to wavelengths in the range 1.45 to 1.65 $\mu$m and another 25,000 GHz which corresponds to wavelengths in the range 1.2 to 1.35 $\mu$m.

An economical optical filter either fixed or tunable that is compatible with single-mode optical fibers and having bandwidths between 1 and 130 GHz with low insertion loss will be an important component in third generation systems that use wavelength division demultiplexing, wideband channel switching, Erbium-doped fiber receivers, Erbium-doped fiber lasers, or other optical processing functions. The fiber Fabry-Perot (FFP) interferometric filter is such a component.

Historically, the Fabry-Perot (FP) interferometer has provided seminal information in many scientific fields including atomic physics, material science, astronomy, lasers and optical communication. This device, first described by C. Fabry and A. Perot in 1897 (Ann. Chem. phys., 12:459–501) consists of an optical cavity between two highly reflecting, low loss, partially transmitting mirrors. Lenses are typically used to generate collimated optical beams so that divergent optical beams can be processed through the FP interferometer. Single-mode optical fibers can also be used with traditional lensed FPs except that lenses with large beam expansion ratios are required with single-mode fibers resulting in reduced stability and poor optical performance.

The FFP interferometric filter consists of two highly reflective preferably plane-parallel mirrors as in conventional FPs except a length of single-mode optical fiber extends between the mirrors. The fiber inside the cavity provides guidance, eliminates the need for collimating and focusing lenses and therefore improves stability and optical performance. Single-mode fiber pigtails make the device compatible with single-mode optical fibers and other fiber devices such as splitters, couplers and amplifiers. Early FFP interferometric filters had long cavities that made them unsuitable for most telecommunication applications.

In 1987, J. Stone and L. W. Stulz described three configurations of FFP interferometric filters (Elect. Lett., 23(15):781–783, 1987), Types I, II and III, that span a wide spectrum of bandwidths and tuning ranges.

The Type I FFP is a long cavity (1–25 cm) FFP filter in which mirrors are positioned at the ends of a continuous fiber and the fiber is stretched by piezoelectric transducers (PZTs) to produce tuning of the bandwidth (BW) over the free spectral range (FSR). These long cavity devices, while not necessarily important for applications in telecommunication systems, are of interest for sensory applications.

The Type II, short cavity FP filter is a gap resonator which has no fiber inside the optical cavity and as a consequence can exhibit significant losses. The useful cavity length limit of this filter is less than about 5 $\mu$m. For this reason and since the FSR and BW are wide, the type II FFP is not well-suited for telecommunication applications.

The type III FFP has an internal waveguide of length intermediate between Type I and II FFPs (5 $\mu$m to 1 cm) interposed between external fiber ends. Mirrors are positioned at an external fiber end and at one end of the waveguide. The optical cavity contains a gap the width of which can be changed to tune the filter.

Types II and III FFPs are the subject of U.S. Pat. No. 4,861,136. This patent relates to an FFP which is tuned by use of piezoelectric transducers (PZTs) to change the cavity length. In order to use PZTs to change the cavity length without changing the alignment between the mirrors of the FFP, elaborate and therefore expensive alignment brackets and fixtures have been necessary. Such tunable FFPs require up to four PZTs, which are expensive device elements, to generate a rigid balanced geometry. An advantage of PZT-actuated tuning is a relatively rapidly tuned FFP filter, which is typically capable of being tuned in 1 msec.

SUMMARY OF THE INVENTION

It is an object of this invention to provide low-loss, fixed and tunable FFP filters. It is a further object of this invention to provide simple, rigid, low-loss FFP configurations that are low cost. It is another object of this invention to provide temperature and index of refraction tuned FFP filters that have a tuning range and bandwidth that are useful in telecommunication applications.

To achieve these objects, the present invention provides a fixed FFP which comprises a ferrule assembly having an optical cavity along a length of optical fiber axially disposed therein and an alignment fixture for holding the ferrule assembly in rigid axial alignment to achieve alignment of the optical fibers of the ferrule assembly. The ferrule assembly is an axial assembly of cylindrical fiber ferrule elements in the alignment fixture and optionally contains, fiber wafer elements or fiber waveguide elements interposed between the ferrules. Each of these elements of the ferrule assembly has a substantially axial bore for receiving an optical fiber. The ferrule assembly contains two ferrules. In a ferrule, an optical fiber end is flush with one end-face of the ferrule. The ferrule assembly optionally contains a fiber wafer or a fiber waveguide both of which elements contain two optical fiber ends flush with each end face of the element. A fiber wafer is typically axially aligned with and rigidly affixed to a ferrule end face, which is flush with the optical fiber end, to produce a wafered ferrule. One or both of the ferrules of the ferrule assembly can be wafered ferrules. A fiber waveguide is typically interposed between and axially aligned with two ferrules and is not necessarily rigidly affixed to either ferrule end face. The ferrules and any wafers or waveguides within the ferrule assembly are axially aligned and spaced to maximize transmission of an optical signal of a selected wavelength or frequency through the optical fiber of the ferrule assembly. In certain embodiments of this invention, the optical fiber of the ferrule assembly is discontinuous, containing at least one gap in the optical fiber between the end faces of the ferrules. The gap is at an interface between two of the sequential elements of the ferrule assembly. The gap can be between a fiber end and a mirror or between two fiber ends. The optical cavity of the FFP is formed along a length of the optical fiber between two, preferably plane-parallel, opposed reflective surfaces or mirrors traverse to the optical fiber axis within that ferrule assembly. The mirrors are typically positioned at end faces of ferrule assembly elements, most typically at the end faces of the ferrules. A wafered ferrule can contain an embedded mirror at the interface between the ferrule end and the wafer.

The fixed cavity length FFP configurations of this invention can be rendered wavelength or frequency tunable by varying the optical path length of the cavity by changing the index of refraction of the optical cavity while maintaining the cavity length fixed. This can be accomplished by introducing into the gap within the cavity a material the index of refraction of which can be selectively changed or controlled. Electro-optic, magneto-optic and thermo-optic materials whose indices of refraction can be controlled, respectively, by a varying electric or magnetic field or by changing the temperature of the material.

In a preferred, fixed FFP of the present invention, the ferrule assembly is aligned with a rotary mechanical splice alignment fixture. This alignment fixture provides high precision alignment of the fiber of the ferrule assembly required to achieve low-loss operation of the FFP filter. In a more preferred, fixed FFP having a rotary mechanical splice alignment fixture, the alignment rods of the rotary mechanical splice fixture are fabricated of a material having substantially the same thermal expansion coefficient as the material used to fabricate the fiber ferrules, wafers and waveguides. In preferred embodiments, the alignment rods of a rotary mechanical splice alignment fixture of a fixed FFP are glass, i.e., Pyrex ®, or quartz. Preferred fixed FFP filter comprise a single wafered ferrule with an embedded mirror and a ferrule having a mirrored end face. Fixed FFPs of the present invention, particularly those which employ waveguide elements within their optical cavities, can employ two rotary mechanical splice alignment fixtures.

To achieve a temperature tunable FFP, the ferrule assembly of an FFP is aligned with an alignment fixture which provides a means for changing the temperature of the FFP and thereby changing the length of the optical resonance cavity. The alignment fixture must provide temperature adjustable cavity length, while maintaining rigid axial alignment of the ferrule assembly elements to ensure low-loss of desired transmissions through the FFP. The alignment fixture must provide for elongation or contraction of the optical cavity along the optical fiber axis as a function of temperature without substantial change to the optical fiber alignment in the ferrule assembly, i.e., the alignment fixture should preferably expand and contract symmetrically along all of its dimensions. A means for changing the temperature of the FFP filter is placed in thermal contact with the FFP alignment fixture. Suitable means for temperature tuning of the FFPs of the present invention include among others thermoelectric heater/coolers which function as heat pumps and resistive heaters.

The temperature tunable FFPs of the present invention can be narrowly or more broadly tunable. Broad tuning relates to those FFPs that are tunable over substantially a FSR (free spectral range), i.e., greater that about 85% of an FSR of the FFP with a relatively small temperature change, of less than about 20° to 30° C. Broadly tunable FFPs are particularly useful in applications requiring frequency or wavelength tuning. FFPs that are more narrowly tunable e.g. over less than about 30% of an FSR with a larger temperature change of greater than about 20°-30° C. are of particular use in essentially fixed wavelength applications which require that the filter be adaptable to small wavelength of frequency fluctuations.

One exemplary narrowly tunable or trimmable FFP filter comprises a ferrule assembly aligned with a rotary mechanical splice alignment fixture having a means for changing the temperature of the FFP in thermal contact with the alignment fixture. The materials used in the preparation of ferrule assembly elements and alignment rods of the rotary mechanical splice can be adjusted to increase or decrease the temperature tuning range of an FFP. The tuning range of an FFP aligned with a rotary mechanical splice will generally increase if the alignment rods of the splice and the ferrule assembly elements are fabricated from materials which have different thermal expansion coefficients. The tuning range of such an FFP can also be changed by varying the length over which the ferrule assembly elements are in rigid contact with the body of the alignment fixture. FFP ferrules and wafered ferrules can be structurally adapted to change the length of rigid contact that they make with the alignment fixture and to thereby change the tuning range of an FFP. Temperature tunable FFPs of this invention can employ one or two mechanical splice alignment fixtures.

An exemplary broadly tunable FFP of this invention comprises a ferrule assembly with fiber etalon cavity which is aligned employing a fixture having a one-piece body which expands or contracts symmetrically along all of its dimensions as a function of temperature. The fixture body is fabricated from materials having the same thermal expansion coefficient and has a cylindrical alignment passage for receiving and aligning ferrule assembly elements and rigidly holding those elements in relative axial alignment. The fixture is preferably fabricated from a material having a large positive thermal expansion coefficient, such as a metal, for example, stainless steel or brass. The fixture must be substantially non-deformable on applications of operational temperatures, i.e., temperatures used in tuning the filter. The alignment fixture comprises adjustable means for holding the ferrule assembly elements within the alignment passage in rigid contact with the body of the alignment fixture. For example, a plurality of screws which traverse the body of the alignment fixture to contact a ferrule within the alignment passage can be employed to rigidly hold that ferrule in contact with the body of the fixture. The alignment fixture can optionally have a means for adjusting alignment of the ferrule assembly. For example, an alignment adjustment screw can be provided which will contact a ferrule or waveguide of the ferrule assembly within the passage to change the relative axial position of that element with respect to the other ferrule assembly elements. Once positioned in the alignment passageway and held in fixed position, the fixed elements of the ferrule assembly will move in a direction along the axis of the optical fiber relative to each other as the alignment fixture symmetrically expands and contracts with temperature, so that the length of the resonance cavity of the FFP is thereby changed without substantial change to alignment of the ferrule assembly.

DETAILED DESCRIPTION OF THE INVENTION

An FFP interferometer consists of two plane parallel reflective surfaces or mirrors, preferably highly reflective, separated by a length of single-mode fiber, $l_c$, with two single-mode fiber pigtails which are mounted within a cylindrical members to form fiber ferrules. To achieve low-loss, high tolerance alignment of the optical fibers through the device is required. Prior art methods for achieving the fiber alignment necessary for low loss fixed FFPs have required the use of high precision brackets. Many applications of FFPs require that the resonance cavity length be variable, e.g., to achieve wavelength tuning. Broad tuning range applications require tuning over a substantial range of a FSR (free spectral range), i.e., more than about 85% of a FSR. Often times, even when a FFP is intended for fixed cavity length operation, it is desirable to have the capability to make minor adjustments to cavity length to adapt the FFP to variations in source wavelength or frequency or to slightly vary the filter output.

For tunable operation, the means used for alignment of an FFP must retain high precision alignment but allow variation in the cavity length so that the filter can be tuned. One solution to these exacting requirements has been the combination of high precision brackets with piezoelectric transducers to stretch the resonance cavity. The present invention provides alternative lower cost solutions for low-loss, fixed and tunable FFPs.

Figure 1:
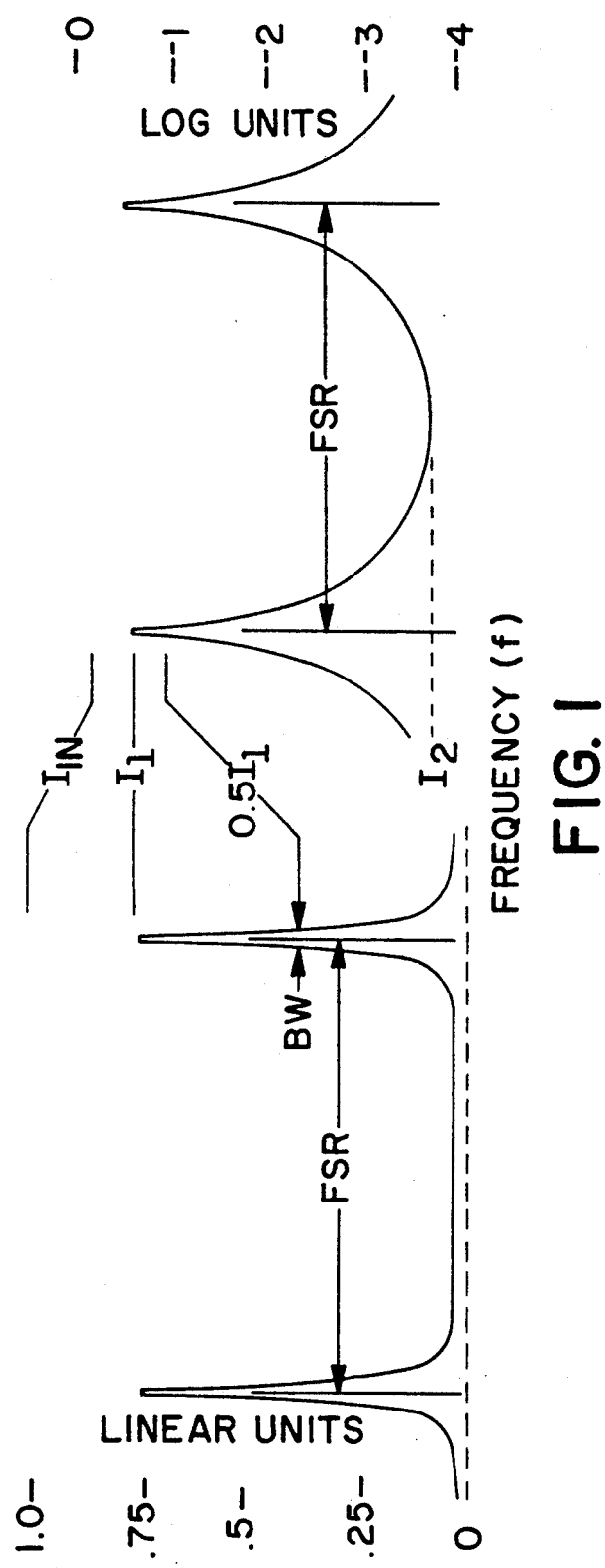
FIG. 1 is example transmission of an FFP of the present invention at fixed cavity length $l_c$.

FIG. 1 schematically show the characteristics of transmission (frequency) of a typical FFP of length, $l_c$. The fractional transmitted power, $I_t/I_{in}$, through the optical cavity is $$I(f) = \frac{k}{1 + \left(\frac{2F}{\pi} \sin[2\pi n l_c/\lambda]\right)^2} \quad (1)$$

where $l_c$ is the cavity length which is the length of single-mode optical fiber and any fiber gaps or spacing between the mirrors which form the cavity, n is the index of refraction of the cavity material, F is the finesse of the cavity and k is the insertional loss. For the lossless case, k is 1 and the ideal F is dependent only on the reflectivities of the mirrors (R, where the reflectivities of the mirrors are assumed to be equal) and $$F = \frac{\pi \sqrt{R}}{(1 - R)} \quad (2)$$

For a fixed value of n, when $nl_c = m\lambda/2$, where m is an integer, equation 1 has maxima corresponding to a resonance condition within the cavity. Incident light with a wavelength ($\lambda$) that is an integer multiple of the cavity optical path length ($nl_c$) is transmitted with little attenuation. Incident light of other wavelengths is highly attenuated. For a given m, changing $l_c$ or $\lambda$ results in a shift in transmission maximum as shown in FIG. 1. Insertion loss is the minimum loss through the FFP and is equal to $-10 \log k$ or $-10 \log (I_1/I_{in})$ referring to FIG. 1. The difference between the frequencies of the resonance peaks, for constant $l_c$ and $\lambda$, is the free spectral range (FSR)=$c/2nl_c$, where $c = 3 \times 10^8$ m/s. Frequency is equal to $c/\lambda$ and $\Delta f$ is equal to $-(c/\lambda^2)\Delta\lambda$. An FFP is tuned between successive resonance maxima by, for example, changing $l_c$. (Alternatively, tuning of the FFP can be accomplished by changing n.) The bandwidth (BW) is the full width at half maximum as indicated in FIG. 1. The finesse of the filter, F=FSR/BW, can be measured experimentally by measuring the ratio of FSR to BW from the transmission curves generated by varying $l_c$ with constant $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR. The contrast factor (C) is equal to $-10 \log (I_2/I_1) = 10 \log (1+(2F/\pi)^2)$.

For purposes of this description the following terms are defined:

The term temperature tunable is used to refer to FFP filters in which the wavelength or frequency of the transmission output of the filter is changed, shifted or tuned by changing the temperature of the FFP. In the temperature tunable FFPs of this invention, changing the temperature of the alignment fixture of the FFP changes the length of the resonance cavity of the filter and changes the wavelength or frequency of transmissions of the filter. The maximum tuning range of an FFP filter is the FSR. A filter that is broadly tunable herein refers to one that is tunable over a substantial portion of the FSR, e.g., greater than about 85% of a FSR, with a relative small change in temperature, e.g., a change of 20° to 30° C. A wavelength or frequency trimmable FFP is a narrowly tunable filter, for example tunable over less than about 30% of a FSR, with a larger temperature change of greater than 30° C. The term temperature tunable includes the extremes of narrow and broad tuning of wavelength and frequency and also includes ranges intermediate between these extremes. Preferable for use as a wavelength or frequency tunable or trimmable FFP is a filter that can be tuned over a minimum of 5% of a FSR with a temperature change of about 20° to 30° C.

The term fixed FFP refers to FFPs intended to be operated at substantially constant optical cavity length between the etalon mirrors. Often such fixed FFPs will require a means for maintaining a substantially constant cavity length in spite of temperature fluctuations. Thermal insulation and temperature compensation schemes can be employed to limit the variation of cavity length with variations in ambient temperature. A temperature tunable FFP may, for example, be combined with temperature sensing and heater/ cooler control circuits to maintain a substantially constant temperature of the FFP. In this case, the temperature controlled FFP can function essentially as a fixed FFP. Fixed cavity length FFPs can function for wavelength or frequency tuning by changing the index of refraction of the material filling the gap along the cavity length.

The ferrule assembly of the present invention contains at least two ferrules one or both of which can be wafered ferrules, as detailed below. Ferrules can be made from glass, for example Pyrex ®, quartz or ceramic. A ferrule assembly can optionally contain a fiber waveguide. The term wafer is used to refer to a relatively short length of cylindrical rod having an axial fiber therethrough, i.e., a short waveguide. The wafer is fixed to the end of a fiber ferrule so that the fibers of the ferrule and the wafer are aligned. Wafers are typically prepared by cutting or grinding of fiber ferrules and, thus contain two fiber ends. Wafers can be made of the same materials as ferrules. Typically, but not necessarily, the wafer and ferrule in a wafered ferrule are fabricated from the same material. Typical wafer thicknesses range from several microns to hundreds of microns, depending on the application. Fiber waveguides are substantially cylindrical elements having a substantially axial optical fiber therethrough. Waveguides also contain two fiber ends and can be made of glass, quartz or ceramic. Waveguides need not be bonded to a ferrule and are longer than wafers, typically ranging from about 1-10 mm. The lengths of ferrules and alignment fixtures are not crucial to operation of FFPs and are typically chosen for convenience of use. Wafers and/or waveguides typically compose a portion of the optical cavity and the length of these elements is chosen based on the wavelength or frequency region of interest for a FFP application.

The term alignment refers to axial alignment of optical fiber ends of sequential ferrule assembly elements. The longitudinal axis of the ferrule, its long axis, is the axis along which the optical fiber is positioned. Ferrule assembly elements are aligned within alignment fixtures by use of the rotary alignment technique as described, for example in U.S. Pat. No. 4,545,644. The optical fibers are aligned by rotating the fiber ferrules relative to each other to obtain maximum transmission through the fibers of the FFP at a chosen wavelength or frequency. In those FFPs which have a gap within the optical cavity, the gap is typically "tuned", i.e., the initial gap spacing in the ferrule assembly is set, to a desired initial wavelength (or frequency) by slightly varying the gap length during ferrule rotation to obtain transmission at the desired wavelength (or frequency). The initial gap is typically set when the ferrule assembly elements are aligned. In temperature tunable FFPs, the gap width is set to accommodate the desired range of cavity length tuning. For example, if it is desired to tune over a FSR at a wavelength of 1.5 μm it is desirable to set the initial gap of the FFP so that the cavity length can be decreased by at least about 0.75 μm. The initial gap should preferably be set at less than about 2 μm-3 μm to minimize diffractive loss, see below.

The term alignment fixture refers to a fixture which functions to hold the aligned elements of a ferrule assembly in rigid axial alignment. The alignment fixture has a means for receiving ferrules and/or wafered ferrules and/or waveguide elements, such as a passage within the body of the fixture, so that the elements can be axially aligned. The alignment passage itself is constructed to high tolerance and can be formed, for example, by high precision machining through a fixture body to result in a substantially cylindrical, substantially smooth, substantially straight passage or by combining alignment elements, like alignment rods, to form a substantially straight, substantially smooth passage which will accommodate cylindrical ferrule assembly elements. The alignment fixture also has an adjustable means for holding the aligned ferrule assembly in rigid contact with the body of the fixture. Alignment fixtures that are useful in temperature trimmed or tunable FFPs allow the length of optical cavity of the FFP to vary with temperature without substantial detriment to axial alignment of the ferrule assembly. Misalignment of fibers in the ferrule assembly result in transmission losses. Fibers are aligned to minimize this loss. Most preferably, no change in fiber alignment will occur during temperature tuning of the FFPs of the present invention. It will be appreciated that it is more preferred to minimize any changes in fiber alignment with tuning. However, a small change in alignment resulting in a small loss (or gain) in transmission can occur during tuning without substantial effect on the operability of an FFP in a particular application. Thus, the amount of misalignment acceptable for a temperature tuned FFP is dependent on the constraints imposed by its intended application. The fixed and temperature tunable FFPs of the present invention are designed to be low-loss, as defined below.

The term rotary mechanical splice refers to a particular FFP alignment fixture as described in U.S. Pat. No.

Figure 3:
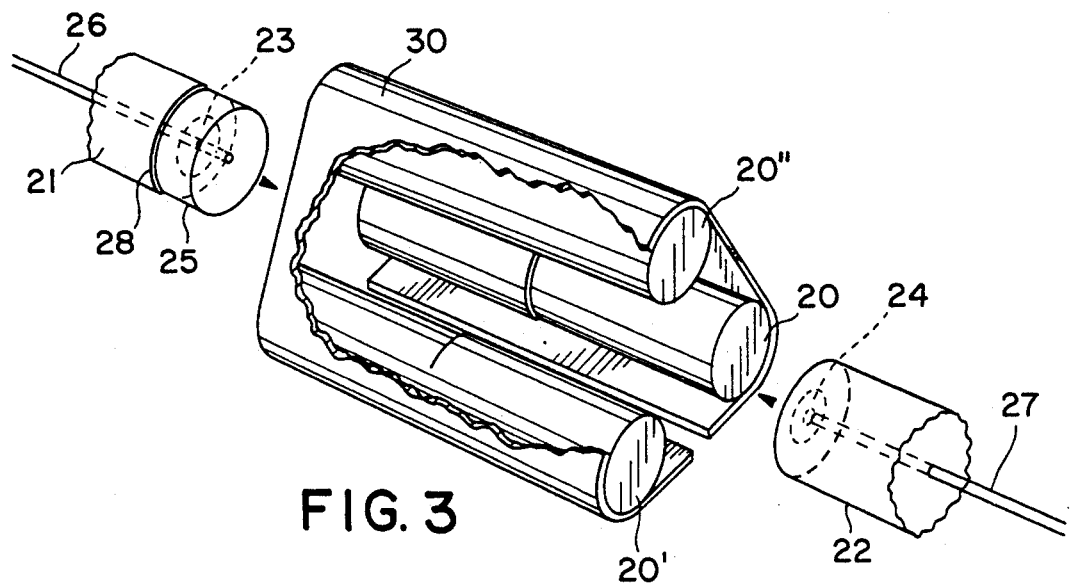
FIG. 3 shows schematically, in partial cut-away view, an exploded exemplary FFP according to the invention.

4,545,644, with particular reference to FIG. 3 therein. U.S. Pat. No. 4,545,644 is incorporated, in its entirety, by reference herein. Rotary mechanical splice alignment fixtures comprise a plurality of, preferably three, alignment rods held within a spring bracket. At least one of the rods, preferably two in a three-rod splice, includes a "flat" as defined in U.S. Pat. No. 4,545,644, extending along the rod from one end for a substantial fraction of the length of the rod. Typically, the flat extends over about one half of the length of the rod, but unsymmetrical rods will function equivalently. Ferrule assembly elements, including two ferrules and/or wafered ferrules are inserted into the splice and aligned therein essentially as described for insertion and alignment of capillary cylinders in U.S. Pat. No. 4,545,644. The spring bracket holds the ferrule assembly elements in rigid contact with the alignment rods which constitute the body of the fixture. For operation of the rotary mechanical splice for alignment, an inserted ferrule must be in rigid contact only with the flat portion or the cylindrical portion of any one alignment rod.

The term low-loss as applied to FFP filters refers to filters having less than or equal to about 3 dB loss. As will be appreciated by those in the art, intensity losses in an FFP can be due to many factors (see J. Stone and L. W. Stulz (1987) supra and D. Marcuse and J. Stone (1986) J. Lightwave Technol. LT-4 pp 377-381) including diffraction and absorption at the mirrors as well as to misalignment of the fibers. It will, thus, also be appreciated that obtaining a low-loss filter will require minimization of all such losses. Means for minimizing losses which are not the result of fiber misalignment within a FFP cavity are well-known in the art.

The terms "high precision" or "to high tolerance" as employed herein to refer to alignment fixtures, refer to machining to a minimum precision of about 0.0001 inch (1/10 mil).

The term optical as used in "optical fiber", "optical cavity" or "optical transmission refers to electromagnetic radiation having a wavelength such that the radiation can be transmitted by means of dielectric fibers with loss less than 25 db/Km. Presently, wavelengths in the range of 400 to 2,000 nm can be transmitted by optical fibers.

J. Stone and L. W. Stulz (1987) supra, and U.S. Pat. No. 4,861,136 have described three types of FFPs. Different types of FFP configurations are shown schematically in FIG. 2. Numbering of FFP elements in the different views of FIG. 2 is the same. Throughout FIG. 2, FFPs are shown within an alignment bracket (10) with a means for fixing the ferrules to that bracket (12). The FP optical cavities in these FFPs are formed by opposed reflective surfaces (mirrors) 23 and 24 which are preferably plane-parallel. The mirrors must be transmissive to allow optical transmission to enter the optical cavity. In a type I FFP, FIG. 2A, the optical cavity is a continuous length of fiber (13), having a ferrule at either fiber end (21 and 22). Mirrors (23 and 24) are deposited as indicated in view A at the fiber ends. The fiber ends face outward from the alignment fixture in Type I FFP. The cavity length is changed by stretching the fiber in this FFP.

A type II FFP is a gap resonator (see FIG. 2B) with mirrors deposited (23 and 24) on the end faces of two fiber ferrules (21 and 22). In views B-E, the optical fibers which exit from the ferrule assembly are indicated as 26 and 27. The mirrored end faces of the fibers are opposed and face into the alignment fixture. Feature 11 is an alignment sleeve. The cavity is formed by spacing the end faces of the ferrules apart. There is no fiber in the gap. Losses in this type of FFP can be significant so the gap is preferably less than about 5 μm.

Figure 2A:
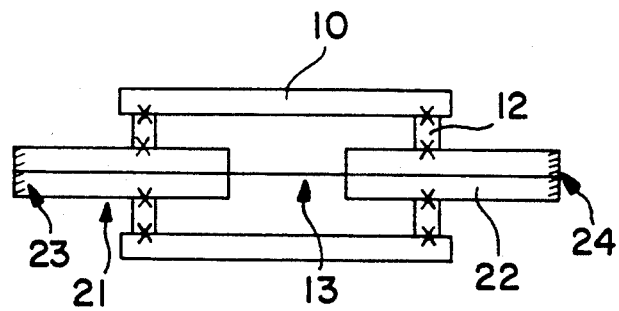
FIGS. 2A-2E show exemplary FFP configurations of ferrules and wafered ferrules useful in the present invention.
Figure 2B:
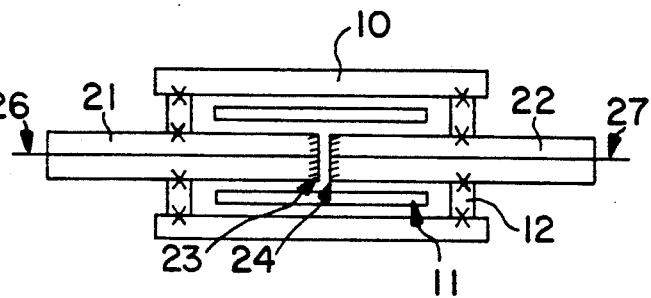
Figure 2C:
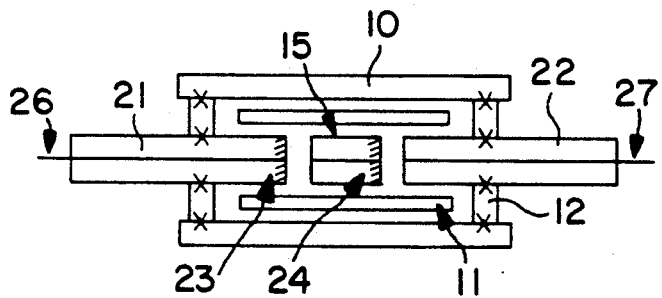

The type III FFP, FIG. 2C, positions an internal fiber containing waveguide (15) having one mirrored end (24) between a mirrored-end ferrule (21 with mirror 23) and a non-mirrored-ferrule (22). The internal waveguide is mirrored on the end face distal to the mirrored-ferrule end face, as indicated. The cavity comprises the length of fiber in the waveguide and any gap between ferrule and waveguide.

Figures 2D, 2E:
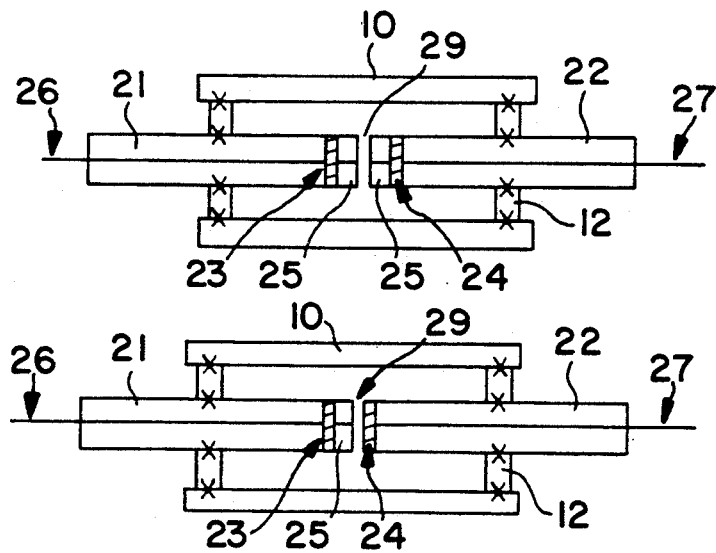
Figure 4:
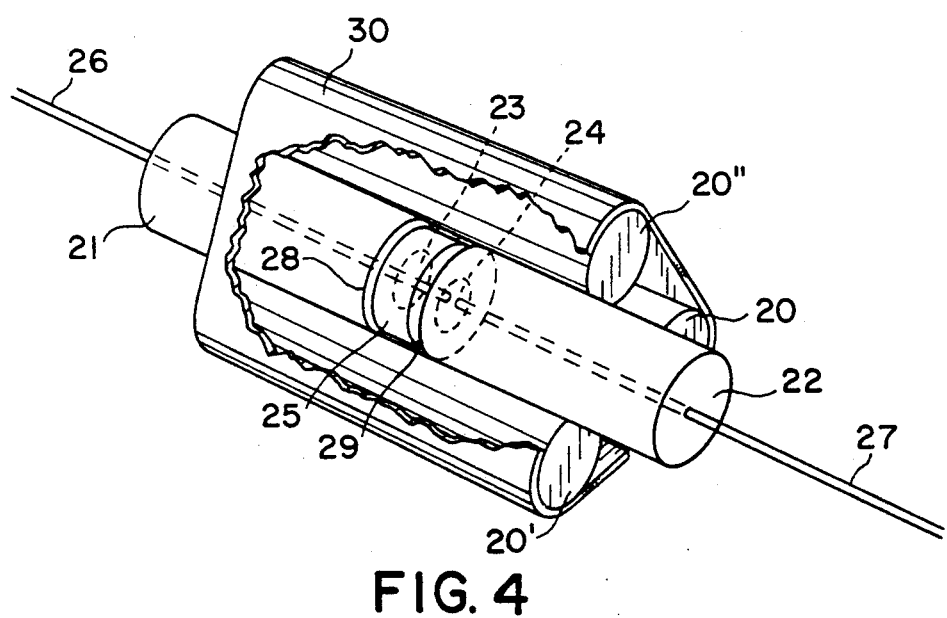
FIG. 4 shows schematically, in partial cut-away view, an FFP according to this invention with mirrored-end ferrules in operable position within the rotary mechanical splice sleeve.

Improved type III FFPs are shown in FIGS. 2D and 2E and in FIG. 4. These FFPs contain a fiber-containing wafer (25) aligned with and bonded to a mirrored-end ferrule (21) to form a wafered ferrule (21+25) with embedded mirror (23). In FIG. 2D two wafered ferrules with embedded mirrors are combined to form a ferrule assembly. In FIG. 2E, a wafered ferrule with embedded mirror is combined with a mirrored-end ferrule to form the FFP. The resonance cavity in these FFPs consists of the fiber through the wafer and the gap between the wafer end and the mirrored-end ferrule. The optical cavity length of the configurations of FIGS. 2D and 2E is changed by changing the gap width. The FFP configurations of FIGS. 2D but not FIG. 2E has been described in EP Patent Application 437963 of J. B. Clayton, C. M. Miller and W. A. Vicory, published Jul. 24, 1991, and refers to U.S. Pat. No. 5,062,684, filed Jan. 17, 1990, for priority, both of which applications are incorporated by reference, in their entirety herein. Details for the preparation of wafers and bonding of wafers to ferrules are described therein and will not be further described herein. All of these FFP configurations require alignment to high tolerance to minimize loss. All of the ferrule assembly configurations shown in FIG. 2 can be employed in the fixed, temperature tunable and index of refraction tunable FFPs of the present invention. The FFP configurations of FIGS. 2C, 2D and 2E are preferred, and that of FIG. 2E is more preferred in the present invention.

FIGS. 3 and 4 describe an exemplary embodiment of a fixed FFP of the present invention. FIG. 3 is an exploded view of the rotary mechanical splice alignment fixture and mirrored-end ferrules which are inserted and aligned therein, as in FIG. 4, to create the FFP. The numbering of elements in FIGS. 3 and 4 is the same and consistent with the numbering used in the other Figures. FIG. 3 shows the essentially cylindrical alignment rods of the rotary mechanical splice fixture (20, 20' and 20") in the three corners of a triangular alignment bracket 30. The alignment rods provide multi-point support for the ferrules 21 and 22 inserted into the sleeve or passage formed by the alignment rods. The ferrules 21 and 22 are composed of capillary cylinders having an essentially axial bore throughout their capillary length through which a stripped optical fiber is threaded. The fiber is typically fixed within the axial bore with an appropriate adhesive, e.g., an epoxy adhesive. The ferrules serve as fiber terminus pieces with fibers (26 and 27) extending from the ferrule assembly. At one end of a ferrule, the stripped fiber is cut flush with the ferrule end face and the end face is polished. The capillary cylinders are typically drawn glass, for example quartz or Pyrex®. FIGS. 3 and 4 show a ferrule assembly having a wafered ferrule with embedded mirror (ferule 21+wafer 25 with mirror 23) and a mirrored-end ferrule (22 with mirror 24). The wafer is bonded to its ferrule using an adhesive, 28, that is transparent to optical transmissions through the fiber, e.g. a UV cured epoxy. The ferrule and wafered ferrule are inserted into the alignment fixture as shown in FIG. 4. The spacing of the end faces is adjusted to form a gap (29) which is a portion of the optical path length. The gap is adjusted to maximize transmission of a desired wavelength or frequency. The gap in the FFP can be filled with an index matching material.

The structure and operation of the rotary mechanical splice alignment fixture for alignment of ferrules has been described in U.S. Pat. No. 4,545,644. Alignment rods 20 and 20' carry flats as shown. Ferrule 22 contacts the flat of alignment rod 20 and ferrule 21 contacts the flat of alignment rod 20'. Both ferrules preferably have substantially the same outside diameter. A rotary mechanical splice alignment fixture could be modified to accommodate ferrules of different diameters. In a temperature tunable or trimmable FFP, the outside diameter of the wafer (25) is typically less than that of the ferrule to which it is bonded, so that the wafer is not in rigid contact with the body of the alignment fixture.

Figure 5:
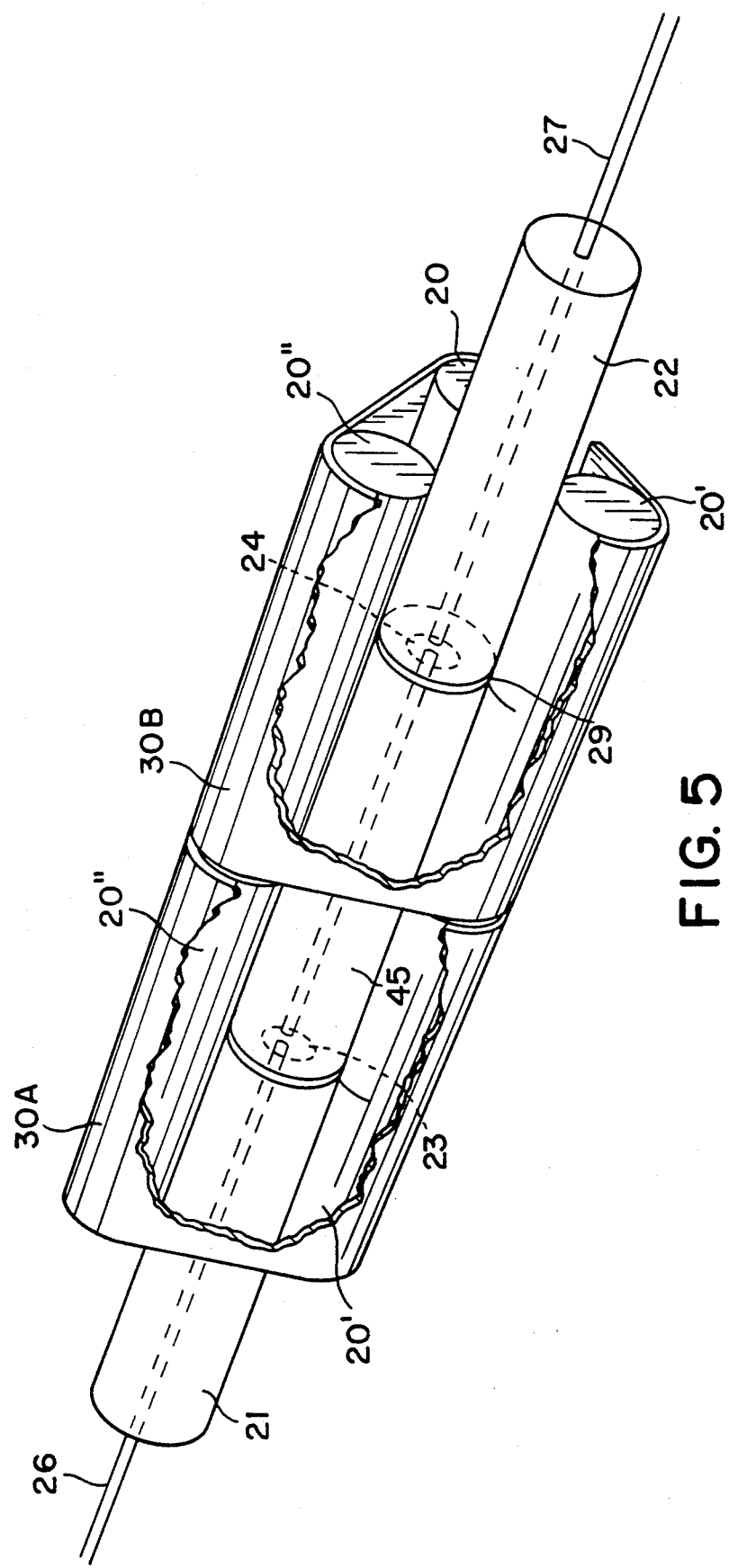
FIG. 5 schematically shows, in partial cut-away view, another FFP according to this invention with ferrules in operable position within the rotary mechanical sleeve.

FIG. 5 shows an alternate fixed FFP of the present invention comprising two rotary mechanical splice sleeves which is useful for FFPs having cavity lengths greater than about 10 mm having waveguide elements. Numbering of elements in this Figure is similar to that in FIGS. 3 and 4. This FFP is essentially the same as that of FIG. 4 except that the wafer is replaced by a significantly longer fiber threaded cylinder, the waveguide (45) which cannot be accommodated by a single standard length (typically 10 mm) rotary mechanical splice alignment fixture. In the FFP of FIG. 5, the internal waveguide is aligned with a mirrored-end ferrule (21). The one end of the waveguide is shown to be flush with the end face of ferrule 21. The other end of the waveguide is separated from mirrored-end ferrule, 22, by a gap (29). The gap in the FFP cavity can be filled with an index matching material. Fibers 26 and 27 extend from the ends of the ferrules. In the FFP of FIG. 5, the resonance cavity comprises the length of the waveguide and the single gap between the internal waveguide and the mirror on the end of ferrule (22). The elements of the rotary mechanical splice alignment fixture are numbered as in FIGS. 3 and 4. The two rotary mechanical splice alignment fixtures are labelled 30A and 30B in FIG. 5. One end of the waveguide contacts the flat of alignment rod 20 of fixture 30A and the other end contacts the flat of alignment rod 20' of fixture 30B. The waveguide, shown in FIG. 5, is in rigid contact with the body of one or the other of the alignment fixtures substantially over its whole length. Alternatively, one or both of the end faces of the waveguide can be provided with a mirrored-end.

The FFPs of the present invention in which the ferrules and wafered ferrules are aligned in a rotary mechanical splice alignment fixture and which contain a fiber gap in the optical cavity can be tuned or trimmed by inserting into the gap along the optical cavity a material having a controllable index of refraction, i.e., which can be changed in a controlled fashion. Changing the index of refraction of the material within the gap results in changing of the optical path length of the cavity ($nl_c$) without changing the distance between the mirrors. Electro-optic materials, like $LiNbO_3$ or liquid crystals, magneto-optic materials, like CdS, and thermo-optic materials, like glycerin or liquid crystals, which respectively, exhibit variations in index of refraction as a function of variation in an applied electric, magnetic field or on variation in temperature, can be introduced into the optical cavity of the FFPs of this invention. The use of such materials in conventional Fabry-Perot filters are well known in the art (see A. Yariv and P. Yeh (1984) "Optical Waves in Crystals", John Wiley and Sons, Inc, New York). For example, K. Hirabayashi et al. (1991) has described the use of a electro-optic material, a nematic liquid crystal, for the tuning of a FP filter.

The FFPs of the present invention in which the ferrules and wafered-ferrules are aligned with rotary mechanical splice alignment sleeves can be tuned by selectively varying the temperature of the FFP. Changing the temperature of the filter changes the cavity length as the component parts of the FFP expand or contract with changing temperature. The FFP can be heated, for example using a resistive heating element. Alternatively, the FFP can be heated or cooled relative to an external reference temperature using a thermoelectric heater/cooler (THC) such as the commercially available Frigichip ® heat pump (Melcor, Trenton, N.J.). One or more heating or cooling elements are placed in thermal contact with the FFP, for example, by mechanical or adhesive bonding of the heating element to the spring bracket of the rotary mechanical splice. The heating or cooling unit can optionally be enclosed in an insulating housing to minimize heat loss. The heating or cooling unit can be optionally combined with a means for sensing the temperature of the FFP and a means for controlling the heating or cooling unit which function in concert with the unit to maintain the device at a chosen temperature or regulate the temperature of the device.

Figure 6:
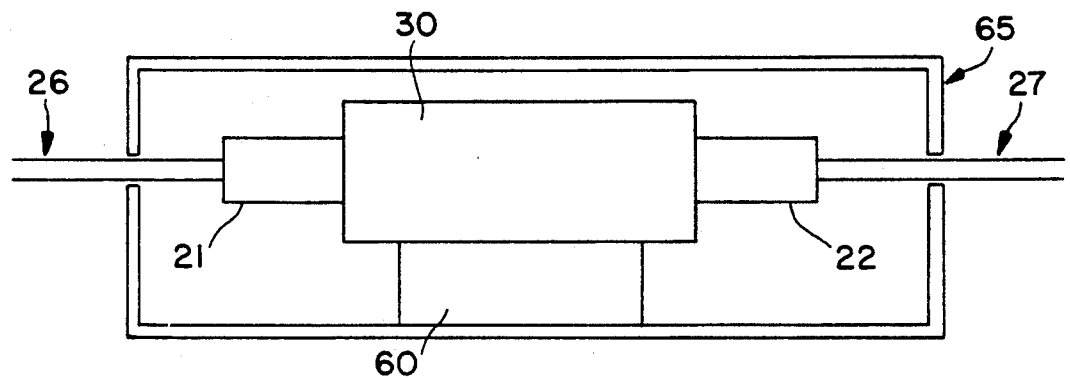
FIG. 6 schematically shows a cross-sectional view of the positioning of a electrical heater/cooler in the temperature tunable FFPs of the present invention.

FIG. 6 provides a schematic diagram of the placement of a THC (60) in thermal contact with an FFP of this invention. As shown, the device is provided with a housing (65), from which fibers (26 and 27) exit, the THC is placed in thermal contact with the FFP and the housing. The housing is at a reference temperature $T_R$. The FFP is not in direct thermal contact with the housing. Passage of a current through the THC heats or cools the FFP relative to $T_R$, as is understood in the art. The THC temperature controlled FFPs may be provided with a means for maintaining $T_R$ substantially constant or means for avoiding substantial changes in $T_R$. Both resistively-heated FFPs and THC-heated or cooled FFPs can also be provided with temperature sensing means and control circuits which function with the heater or heat pump to maintain the FFP at a selected temperature or within a selected temperature range.

For an FFP a cavity length thermal coefficient, $a_{lc}$, reflecting the change in cavity length/C° can be defined. The larger this coefficient is, the greater is the change in cavity length exhibited by the FFP with a change in temperature. A positive coefficient, as is conventional, indicates that cavity length will increase with temperature. The absolute magnitude and sign of this coefficient will depend on the materials employed in the FFP and the specific structure of the FFP and its alignment fixture. A larger absolute magnitude of thermal coefficient is associated with an FFP in which the alignment rods of the rotary mechanical splice sleeve are made of a different material than the ferrules and wafers due to the different thermal expansion coefficients ($\alpha$) of the two materials. For example, the ferrules and wafered-ferrules can be made of quartz while the alignment rods are made of Pyrex ®, stainless steel, brass or other suitable material. Thus, to achieve increased cavity length changes for a given temperature change, it is preferred that the alignment rods and/or the spring bracket of the rotary mechanical splice be made of a material having a different α than that of the material of the ferrules and wafers. In exemplary embodiments, the ferrules and wafers are Pyrex ®, while the alignment rods are stainless steel, brass or some other suitable material. Alternatively, the ferrules and wafers are quartz, while the alignment rods are Pyrex ®, stainless steel, brass or other suitable materials. For broader temperature tunability, it is preferred to employ alignment rods and spring brackets having large positive thermal expansion coefficients. Those of ordinary skill in the art know how to select materials having α appropriate for use in the FFPs of the present invention. The term thermal expansion coefficient, as used herein, has its conventional art recognized meaning. A large positive thermal expansion coefficient refers to an α greater than or equal to about $10 \times 10^{-6}/°C$.

Figure 7A:
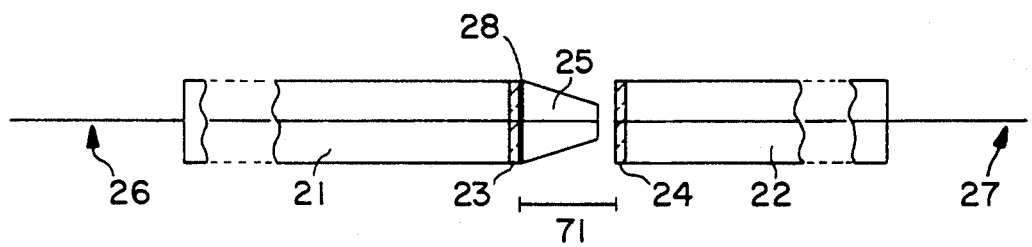
FIGS. 7A and 7B schematically show mirrored-end ferrule configurations according to this invention. The figures schematically demonstrate how the length of the contact between a ferrule and the body of the alignment fixture can be changed.
Figure 7B:
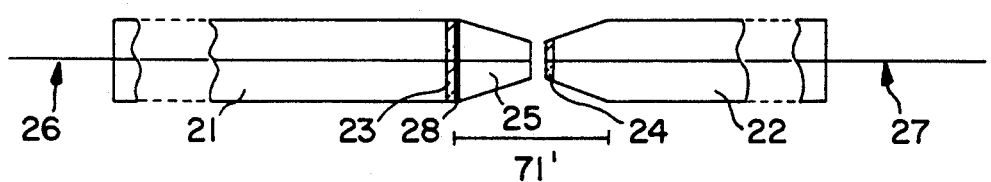

The wafer portion of the wafered ferrules described above is typically ground such that the wafer portion has an outer diameter that is smaller than that of the ferrule to which it is bonded. This is done to ensure that no portion of the wafer edge extends past the outer diameter of the ferule portion in the aligned wafered ferrule. (After fiber alignment the outer diameters of the wafer and ferrule may not be aligned.) As a result, the wafer portion of the wafered ferrule is, typically, not in rigid contact with the alignment rods of the alignment sleeve. The wafer portion of the wafered ferrule can, thus, expand or contract with temperature change essentially independent of the alignment rods. The $α_{lc}$ of the FFP can be changed by varying the length of the ferrules (wafer and/or waveguides) not in rigid contact with, i.e., decoupled from, the alignment rods. FIG. 7 shows how the contact length of ferrules with the body of an alignment fixture can be varied. The length of the ferrules decoupled from the fixture body is shown in FIG. 7A as 71 and in FIG. 7B as 71'. FIG. 7 compares two exemplary ferrule assembly configurations, that of FIG. 7A to that of FIG. 7B, employing a wafered ferrule with embedded mirror and a mirrored-end ferrule. In FIG. 7O, the outer diameter of the wafer is less than that of the ferrule portion of the wafered ferrule and the length decoupled from the fixture body is 71. In FIG. 7B, the length of the ferrules not in contact with the fixture body, 71', is increased compared to the length 7A, by also decreasing the outside diameter of a portion of mirrored-end ferrule (22). In FIG. 7B, the end portion of 22 can expand or contract essentially independent of the alignment rods. The length of the end portion of the ferrule or wafered ferrule that is not in rigid contact with the alignment rods can be varied to change the cavity length thermal coefficient; however, the modification of the ferrules must not interfere with the alignment function of the rotary mechanical splice fixture. In a standard 10 mm length rotary mechanical splice alignment fixture, preferably at least about a 3 mm length of each ferrule is in rigid contact with the fixture body.

Figure 8:
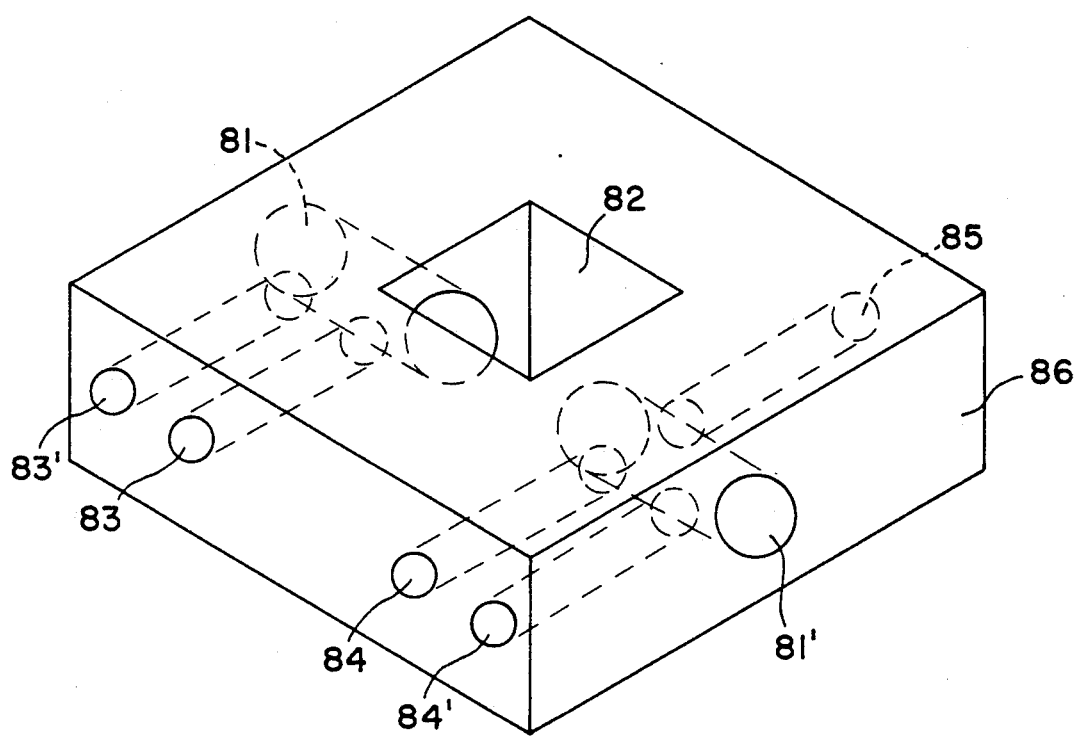
FIG. 8 is a schematic diagram of an exemplary temperature FFP alignment fixture which allows broad temperature tuning.

A second FFP alignment fixture suitable for use in temperature tunable FFPs and particularly useful for broad temperature tuning applications is schematically shown in FIG. 8. This fixture provides alignment of inserted ferrule elements to the high tolerance required to achieve low-loss and broad temperature tuning of the FFP substantially over an FSR with no significant detrimental effect on operability of the FFP. The alignment fixture of FIG. 8 has a cylindrical alignment passage extending through the body of the fixture, 81 and 81', for receiving the ferrule assembly. In this case, the alignment passage is in two portions. The alignment passage of the exemplified fixture is interrupted by a cavity extending through the center of the fixture, 82, perpendicular to the axis of the alignment passage. This cavity allows the central portion of the ferrule assembly to be seen to assist in adjustment of alignment and functions to interrupt the alignment passage to provide a region in which the expansion and contraction of the ferrules is decoupled from that of the fixture. The exemplary fixture of FIG. 8 has a passage which is in two portions (81 and 81'). These two ends of the passage must be aligned to each other with high precision. High precision machining processes are well known in the art. For example, wire electron discharge machining (EDM) can be used to create the high precision passage of FIG. 8.

The alignment fixture has a one-piece body (86) provided with a means for holding the ferrules in rigid contact with the fixture body. Specifically provided in FIG. 8 are a plurality of threaded screw holes which extend through the body of the fixture into the alignment passage and which are provided with screws which on being tightened can contact and hold a ferrule in place within the passage. Each ferrule or wafered-ferrule is preferably held with at least two such holding screws. FIG. 8 shows the positioning of two such holding screw means (83, 83' and 84, 84') for each of the ferrules of the ferrule assembly. The holding screws are preferably positioned so that they all enter the passage from the same side of the body as indicated in FIG. 8 to hold the ferrules against the side of the passage. The screws employed for holding the ferrules rigidly in place, are preferably tipped with a soft metal such as copper to avoid scratching of the ferrule assembly elements. The region in which the expansion and contraction of the ferrules is decoupled from that of the alignment fixture extends between the innermost positions at which the ferrules are held to the body, in FIG. 8 between holding screws 83 and 84.

The alignment fixture is also provided with a means for adjusting the alignment of one or both of the ferrule elements in the alignment passage. In FIG. 8, a threaded screw hole is shown which extends through the body of the fixture into the alignment passage, 85. An alignment screw positioned and tightened into this threaded hole will extend into the passage and contact a ferrule inserted within the passage. The relative axial alignment of the ferrules within the passage is adjusted by changing the length of the adjustment screw that extends into the passage. As indicated in FIG. 8, the adjustable alignment screw is positioned so that the screw enters the alignment on the opposite side from the holding screws. To maximize the magnitude of $α_{lc}$ for this FFP, the body of the alignment fixture is preferably fabricated from a material having a high positive thermal expansion coefficient, such as a metal, for example stainless steel. The holding screws and the alignment screw are fabricated of a material that is compatible for use with the material of the body and the screws are preferably tipped with a deformable material such as copper to avoid scratching of the ferrules.

In a preferred exemplary temperature tunable FFP, a wafered ferrule with embedded mirror and a mirrored-end ferule are introduced into the alignment passage of the alignment fixture of FIG. 8. The ferrules are positioned within the passage and spaced and aligned with respect to each other to maximize transmission of an optical signal of a desired wavelength through the FFP. A small gap (typically about 1 μm or less, but not more than about 2-3 μm) is left between the faces of the ferules to allow for variation of the cavity length. Alignment is performed using the conventional rotary alignment process. Briefly, the ferrules are partially fixed in the passage, with a desired small spacing between the ferrules. The ferrules are then iteratively rotated with respect to each other preferably to achieve a maximal transmission through the optical fiber of the FFP. Once the desired rotary alignment has been obtained the holding screws are fully tighten to rigidly hold the ferrules in place. Adjustment of the alignment adjustment screw may then result in an improvement of ferrule assembly alignment.

The alignment fixture of FIG. 8 is preferred for use in temperature tunable FFPs having a means for changing the temperature of the FFP. A temperature tunable FFP employing the alignment fixture of FIG. 8 can be adapted to fixed wavelength or frequency operation by providing the FFP with temperature sensing and control means.

A thermoelectric heater/cooler (THC) is placed in thermal contact with the body of the alignment fixture, like that of FIG. 8, of a FFP. By placing an appropriate current through the THC, as is known in the art, the temperature of the FFP can be changed, either increased or decreased, with respect to a reference temperature. The temperature tuned FFP is preferably provided with a housing which surrounds the FFP with attached THC. The housing is in contact only with the THC and not in thermal contact with the alignment fixture or ferrules of the FFP. The exemplary temperature tunable FFP described hereinabove can also be provided with a temperature sensing means and control circuit which function together to control current passing through the THC and to allow the temperature of the FFP to be controlled at a desired temperature. The exemplary temperature tunable FFP aligned using the alignment fixture of FIG. 8 and being provided with a THC device is broadly tunable over more than 85% of an FSR.

Any means for holding the ferrules in position in the alignment passage can be employed. It is preferred that means be adjustable to allow for readjustment of alignment and changing the initial gap width.

The alignment fixture of FIG. 8 and the rotary mechanical splice alignment fixture have several functional features in common for use in temperature tuning or trimming FFPs. They both provide a means for rigid alignment of the fibers of the ferrule assembly. Furthermore, the fixtures allow for the introduction of a region in which the expansion and contraction of the ferrules is decoupled from that of the fixture. The length of this decoupled region can be changed in the rotary mechanical splice as exemplified in FIG. 7 by altering the structures of the ferrules and/or wafered ferrules and/or waveguides. The length of this decoupled region can be changed in fixtures like that of FIG. 8 by changing the distance between the ferrule holding means which hold the ferrules to the fixture.

In broad tuning applications, it is most preferred that an FFP be tunable over a full FSR. Such a tunable filter can be constructed combining the expedients described herein for increasing the tuning range. It is preferable to minimize power and thermal insulation requirements so that the full tuning range (FSR) is accessible with a modest temperature change, e.g., of about 50° C. and more preferably with a temperature change of 20° C. to 30° C.

Any type of reflective surface compatible with placement at the faces of fiber ferrules can be employed in the FFPs of this invention. For example, multi-layer, metal oxide, semiconductor or dielectric mirrors can be employed. The reflective surfaces can be deposited on the ferrule end face or fixed to that surface by any appropriate means known to the art. It is desirable to minimize insertional loss and maximize wavelength range in an FFP by using mirror materials and designs that result in low-absorption loss, thin mirrors. This can be accomplished, for example, using multi-layer, low-loss mirror structures with large index differences between layers and a minimum of layers. For high finesse, the use of highly reflective mirrors having R ranging from about 95 to 99% is preferred. In wafered ferrules the mirror need not and preferably does not cover the entire ferule end face. The bonding of the wafer to the ferrule is facilitated by depositing the mirror over the central portion of the face leaving space at the perimeter of the end face for adhesive.

As noted above, the fiber gap present in certain of the ferrule assembly configuration of this invention can be filled with an index matching material. Index matching materials serve to optically couple the fiber. Materials having about the same index of refraction as the fibers are, thus, useful in this invention. Index matching materials in liquid, gel or grease forms are available to the art. Index matching materials include silicone based materials. It is preferred that the index matching material used conform to the dimensions of the gap and to the typically small changes in gap width on tuning. The use, application and operation of index matching materials is generally well-known and understood in the art.

The following examples are provided to illustrate the invention and are not intended in any way to limit the invention.

EXAMPLES

A fiber ferrule was prepared essentially as described in EP Patent application 437963 by threading the stripped end of standard coated single-mode fiber through the axial bore of a ferrule. The protruding end of the fiber was removed to produce a fiber terminus and the end face of the ferrule and with fiber terminus was polished. The fiber ferrule was prepared from a drawn Pyrex ® capillary cylinder. Ferrules are typically 10 mm-25 mm long. A second fiber ferrule was prepared. A multi-layer Si/SiO$_2$ mirror was deposited on an end face of each of the ferrules. The deposited mirror covered only the central portion of the end face covering the optical fiber end. The same deposition process was conducted on both ferrules so that the reflectivities of the deposited mirrors were essentially the same.

The wafered ferrule with embedded mirror was prepared essentially as described in EP 437963. Briefly, a third Pyrex ® fiber ferrule was prepared, the polished end of that ferrule was aligned with one of the mirror-ended fiber ferrules and the two ferrule ends were fixed together with transparent epoxy. A portion of the third ferrule was cut off to give the desired wafer length and produce a fiber end at the exposed face of the wafer.

This end of the fiber wafer was then polished resulting in a wafered ferrule with embedded mirror.

The wafered ferrule and the second mirrored ferrule were introduced into the receiving ends of a rotary mechanical splice sleeve. The sleeve was prepared from three Pyrex ® cylinders essentially as described in U.S. Pat. No. 4,545,644. The ferrules were aligned and spaced by rotation of the ferrules within the alignment fixture to maximize transmission of a selected band pass or wavelength through the resulting FFP at a given temperature. The ferrule and wafered-ferrule are thereafter maintained in this fixed relative relation by means of a spring bracket or elastic alignment bracket. The bracket was formed of beryllium copper. The gap between the wafer end and the mirror of the mirrored ferrule was filled with an index matching material, particularly a silicone. A commercially available index matching silicone AT8955B which is available from A T and T (New Jersey) was employed. The resulting FFP filter with mirror reflectivity of 97%, and wafer thickness of 100 $\mu$m, has a FSR of 1,000 $GH_z$ and a BW of 10 $GH_z$.

A FFP filter having a cavity length approximately equal to 10 mm, was constructed with two rotary mechanical splice alignment fixtures. Ferrules with end-face mirrors were prepared as described above. A fiber waveguide of length about 10 mm was positioned flush with and aligned with one of the mirrored-end ferrules using one of the alignment fixtures. The second alignment fixture was used to align the other end of the waveguide with the second mirrored-end ferrule. The gap between the waveguide end and the second ferrule was adjusted to obtain a desired band pass. Alignment of the ferule assembly was adjusted to maximize transmission of the desired band pass. The gap was filed with AT8955B silicone index matching material. This filter had an FSR of 10 $GH_z$ and a finesse of 80.

An exemplary tunable FFP was constructed from the single rotary mechanical splice FFP, above, by fixing a thermoelectric heater/cooler to one of the sides of the splice alignment fixture as shown in FIG. 6. A commercially available THC (FC-0.7-12-05, Melcor, Trenton, N.J.) was used. Placing ±1.2 amp current through the THC resulted in a total peak to peak change in the cavity length which corresponded to tuning of the FFP over about 30% of a FSR.

The amount of temperature tuning of the FFP is increased by changing the length of the ferrule or wafer in rigid contact with the alignment cylinders. As noted above, the outside diameter of the wafer portion of the ferrule with bonded wafer and embedded mirror is less than the outside diameter of the ferrule portion. The wafer portion is not in rigid contact with the cylinders of the alignment sleeve. The outside diameter of the ferrule having the exposed mirrored face is decreased relative to that of the rest of the ferrule by grinding so that the end of the mirrored face is not in rigid contact with the cylinders of the alignment sleeve. Decreasing the outside diameter of a portion of the mirrored-end ferrule equal in length to the wafer is expected to change the temperature tuning capability of the filter.

One of ordinary skill in the art will appreciate that the configurations, materials and techniques specifically described and exemplified herein can be modified, altered or adapted to achieve the objectives of this invention. All such alterations and modifications that embody the principles of this invention are encompassed within the spirit and scope of this invention.

I claim:

1. A temperature tunable fiber optic Fabry-Perot etalon filter (FFP) which comprises:
   a. a fiber ferrule assembly through which an optical fiber extends and which has a resonance cavity along a length of said optical fiber, said assembly comprising a first and a second ferrule each of which has a substantially axial bore therethrough in which a portion of an optical fiber is positioned, and a first and a second mirror positioned to intercept said optical fiber and thereby form said resonance cavity, said mirrors located in parallel planes with respect to one another, said planes substantially normal to the axis of said length of optical fiber;
   b. alignment means for aligning and holding said ferrules in fixed relative axial relation to one another such that an optical signal can be transmitted through the optical fiber of said assembly; and wherein said alignments means includes a fixture means for holding said ferrules in rigid axial alignment, said fixture means for expanding and contracting symmetrically with changing temperature such that the alignment of said ferrules is not substantially changed when the temperature of said fixture is changed; and
   c. a thermal means in thermal contact with said alignment means for varying the length of said cavity wherein the length of said resonance cavity is changed by changing the temperature of said filter without substantially changing the alignment of said ferrules.

2. The tunable fiber Fabry-Perot filter of claim 1 wherein said thermal means for varying the length of said resonance cavity is a thermoelectric heater/cooler pump.

3. The tunable FFP filter of claim 1 wherein said thermal means for varying the length of said resonance cavity is a resistive heater.

4. The tunable FFP filter of claim 1 wherein said first ferrule is a wafered ferrule comprised of a wafer bonded to said first ferrule at an end thereof.

5. The tunable FFP of claim 4 wherein said wafered ferrule contains said first mirror embedded between the ferrule portion and the wafer portion.

6. The tunable FFP of claim 1 wherein said ferrule assembly further comprises a waveguide element within said cavity interposed between and in alignment with said ferrules.

7. The tunable FFP of claim 1 wherein said means for aligning said ferrules comprises a rotary mechanical splice alignment fixture.

8. The tunable filter of claim 7 wherein said rotary mechanical splice comprises stainless steel alignment rods.

9. The tunable filter of claim 7 wherein the length of the rotary mechanical splice in rigid contact with said ferrules is adjusted to increase the tuning range of said filter.

10. The tunable FFP of claim 7 wherein said means for changing the temperature of the FFP is a thermoelectric heater/cooler.

11. The tunable FFP of claim 1 wherein said alignment means comprises a one-piece body having an alignment passage therethrough for receiving said ferrule and wherein said fixture means for holding the ferrules in rigid axial alignment comprises a plurality of holding screws which traverse the body of said fixture to said passage such that said holding screws can be adjusted to hold said ferrules in alignment and in rigid contact with the wall of said passage, said screws fabricated from the same material as said body.

12. The tunable FFP of claim 11 wherein said alignment means further comprises a means for adjusting the relative axial alignment of said ferrules in said passage.

13. The tunable FFP of claim 11 wherein said body is fabricated from a material having a large positive thermal expansion coefficient.

14. The tunable filter of claim 13 which further comprises temperature sensing means and voltage control means which function in concert with said thermal means to maintain the filter at a constant temperature and thus maintain a substantially constant resonance cavity length.

15. The FFP of claim 1 wherein said alignment means includes a plurality of alignment rods and clamping means for clamping said alignment rods in rigid contact with said ferrules, said alignment rods fabricated from a different material from that material used in said ferrules.

16. The FFP of claim 15 wherein said ferrules are made of glass and said rods are made of metal.

17. The FFP of claim 15 wherein said alignment rods are fabricated from a material having a large positive thermal expansion coefficient.

18. The FFP of claim 17 wherein said material for fabricating said rods is metallic.

19. The FFP of claim 18 wherein said rods are fabricated from stainless steel and said ferrules are made of quartz.

20. The FFP of claim 15 wherein at least one of said ferrules is a wafered ferule comprised of a wafer bonded to said ferrule, the wafer portion of said wafered ferrule having an outer diameter smaller than that of the ferrule portion so that said wafer portion is not held in rigid contact with said alignment rods.

21. The FFP of claim 20 wherein said wafered ferrule contains said first mirror embedded between the ferrule portion and the wafer portion.

22. The FFP of claim 21 wherein said alignment rods are fabricated from a material having a large positive thermal expansion coefficient.

23. The FFP of claim 22 wherein said material for fabricating said rods is metallic.

24. The FFP of claim 23 wherein said rods are fabricated from stainless steel and said ferrules are made of quartz.

25. The FFP of claim 24 wherein the length of the rotary mechanical splice in rigid contact with said ferrules is adjusted to increase the tuning range of said filter.

26. The FFP of claim 25 wherein said means for changing the temperature of the FFP is a thermoelectric heater/cooler.

27. The FFP of claim 4 wherein the wafer portion of said wafered ferrule has an outer diameter smaller than the outer diameter of the ferrule portion of said wafered ferrule, said wafer portion not held in rigid contact with said fixture means.

28. The FFP of claim 27 wherein said wafered ferrule contains said first mirror embedded between the ferrule portion and the wafer portion.

29. The FFP of claim 28 wherein said means for aligning said ferrules comprises a rotary mechanical splice alignment fixture.

30. The FFP of claim 29 wherein the length of the rotary mechanical splice in rigid contact with said ferrules is adjusted to increase the tuning range of said filter.

31. The FFP of claim 30 wherein said alignment means includes a plurality of alignment rods and clamping means for clamping said alignment rods in rigid contact with said ferrules, said alignment rods fabricated from a different material from that material used in said ferrules.

32. The FFP of claim 31 wherein said ferrules are made of glass and said rods are made of metal.

33. The FFP of claim 31 wherein said alignment rods are fabricated from a material having a large positive thermal expansion coefficient.

34. The FFP of claim 33 wherein said material for fabricating said rods is metallic.

35. The FFP of claim 5 wherein said second mirror is deposited on an end of said second ferrule.

36. The FFP of claim 35 wherein said second mirror and a first portion of said second ferrule have an outer diameter smaller than the outer diameter of the remaining portion of said second ferrule.

37. The FFP of claim 36 wherein said alignment means comprises a rotary mechanical splice alignment fixture.

38. The FFP of claim 37 wherein the length of the rotary mechanical splice in rigid contact with said ferrules is adjusted to increase the tuning range of said filter.

39. The FFP of claim 38 wherein said alignment means includes a plurality of alignment rods and clamping means for clamping said alignment rods in rigid contact with said ferrules, said alignment rods fabricated from a different material from that material used in said ferrules.

40. The FFP of claim 39 wherein said ferrules are made of glass and said rods are made of metal.

41. The FFP of claim 39 wherein said alignment rods are fabricated from a material having a large positive thermal expansion coefficient.

42. The FFP of claim 41 wherein said material for fabricating said rods is metallic.

43. The FFP of claim 42 wherein said rods are fabricated from stainless steel and said ferrules are made of quartz.

44. The FFP of claim 1 wherein said ferrule assembly further comprises a waveguide element interposed between and in alignment with said ferrules and wherein said fixture comprises two rotary mechanical splice alignment fixtures, each of said two fixtures in contact with an associated ferrule and one end of said waveguide.

45. The FFP of claim 1 wherein said resonance cavity further comprises a gap in said optical fiber.

46. The FFP of claim 45 wherein said gap is filled with an index matching material.

47. The FFP of claim 45 wherein said gap comprises a material the index of refraction of which can be controlled by application of an electric or magnetic field.

48. The FFP of claim 45 wherein said gap comprises a material the index of refraction of which can be changed by changing the temperature of that material.

49. A fiber optic Fabry-Perot filter (FFP) having:
a. a fiber ferrule assembly through which an optical fiber extends and which has a resonance cavity along a length of said optical fiber, said assembly comprising a first and a second ferrule each of which has a substantially axial bore therethrough in which a portion of said optical fiber is positioned, a first and a second mirror positioned to intercept said optical fiber and thereby form said resonance cavity, said mirrors located in parallel planes with respect to one another, said planes substantially normal to the axis of said length of optical fiber, and a waveguide positioned within said optical cavity between said first and second mirrors; and b. alignment means for aligning and holding said ferrules in fixed axial relation to one another such that an optical signal can be transmitted through the optical fiber of said assembly; and wherein said alignment means includes a first and a second rotary mechanical splice alignment fixture, said first fixture including a first plurality of alignment rods and first clamping means for clamping said first plurality of alignment rods in rigid contact with said first ferrule and a first end of said waveguide, said second rotary mechanical splice alignment fixture including a second plurality of alignment rods and second clamping means for clamping said second plurality of alignment rods in rigid contact with said second ferrule and the second end of said waveguide.

50. The filter of claim 49 wherein said first end of said waveguide is positioned flush with the end face of said first ferrule with said first mirror embedded between.

51. The filter of claim 50 wherein said first mirror is deposited on said end face of said first ferrule.

52. The filter of claim 50 wherein said first mirror is deposited on said first end of said waveguide.

53. The filter of claim 50 wherein said resonance cavity contains a gap between said second end of said waveguide and said second ferrule with said second mirror deposited on said second end of said waveguide.

54. The filter of claim 53 wherein said first mirror is deposited on said end face of said first ferrule.

55. The filter of claim 53 wherein said first mirror is deposited on said first end of said waveguide.

56. The filter of claim 50 wherein said resonance cavity contains a gap between said second end of said waveguide and said second ferrule with said second mirror deposited on the end face of said second ferrule.

57. The filter of claim 56 wherein said first mirror is deposited on said end face of said first ferrule.

58. The filter of claim 56 wherein said first mirror is deposited on said first end of said waveguide.

59. The filter of claim 49 wherein all alignment rods, ferrules and waveguides are fabricated of a material having substantially the same coefficient of thermal expansion.

60. The filter of claim 59 wherein said material is glass.

61. The filter of claim 53 wherein said gap is filled with an index matching material.

62. The filter of claim 56 wherein said gap is filled with an index matching material.

* * * * *